United States Patent
Liu et al.

(10) Patent No.: US 6,709,252 B2
(45) Date of Patent: Mar. 23, 2004

(54) MOLDING APPARATUS

(75) Inventors: Jie Liu, Singapore (SG); Si Liang Lu, Singapore (SG); Shu Chuen Ho, Singapore (SG); Man Ho Hui, Singapore (SG); Teng Hock Kuah, Singapore (SG)

(73) Assignee: ASM Technology Singapore PTE LTD (SG)

( * ) Notice: Subject to any disclaimer, the term of this patent is extended or adjusted under 35 U.S.C. 154(b) by 125 days.

(21) Appl. No.: 09/901,143

(22) Filed: Jul. 10, 2001

(65) Prior Publication Data

US 2003/0012836 A1 Jan. 16, 2003

(51) Int. Cl.[7] .............................................. B29C 45/16
(52) U.S. Cl. ................... 425/116; 425/127; 425/129.1; 425/590
(58) Field of Search ............................. 425/116, 127, 425/129.1, 590, 451.2, 450.1

(56) References Cited

U.S. PATENT DOCUMENTS 5,269,998 A * 12/1993 Takagi et al. ............ 425/450.1
6,238,195 B1 * 5/2001 Styczynski ................ 425/127

* cited by examiner

Primary Examiner—Tim Heitbrink
(74) Attorney, Agent, or Firm—Morrison & Foerster LLP

(57) ABSTRACT

Molding apparatus (200) is provided for simultaneously molding a molding material around a number of separate substrates, each substrate having a semiconductor chip mounted thereon. The apparatus includes a mold holder (113a, 113b, 114, 103) having a first holding section for holding a first mold half (119) and a second holding section for holding a second mold half (120). The first and second holding sections have a common support surface (135), the support surface (135) including a first movable member (104a) in the first holding section and a second movable member (104b) in the second holding section. The first and second movable members (104a, 104b) are movable between a first position in which they protrude out of the support surface (135) and a second position in which the protrusion from the support surface (135) is less than in the first position. A first drive mechanism (100, 110) is coupled to the first movable member (104a) and a second drive mechanism (100, 110) is coupled to the second movable member (104b). The first and second drive mechanisms (100, 110) are adapted to be independently actuated to move the first and second movable members (104a, 104b) between the first and second positions.

9 Claims, 2 Drawing Sheets

MOLDING APPARATUS

FIELD OF THE INVENTION

The invention relates to molding apparatus, and especially for molding two articles simultaneously.

BACKGROUND OF THE INVENTION

When molding epoxy resin material around a semiconductor chip and a substrate, it has become common practice to perform the molding operation simultaneously on two separate substrates which are located side by side within a mold. Commonly, a number of semiconductor chips are attached to one strip of a substrate and it has become common practice to mold two substrate strips simultaneously in the same mold in order to increase the speed and efficiency of the molding operation.

During the molding operation, the substrate strips are usually clamped between the mold halves. One of the problems with this system is how to compensate for variations in thickness between the two substrate strips to ensure that both substrate strips are clamped between the mold halves with the necessary clamping force.

SUMMARY OF THE INVENTION

In accordance with a first aspect of the present invention, there is provided molding apparatus for simultaneously molding a molding material around a number of separate substrates, each substrate having a semiconductor chip mounted thereon, the apparatus comprising a mold housing adapted to have mounted thereon a mold half comprising two mold cavity members, the mold housing comprising a first mold cavity member holding section and a second mold cavity member holding section, the first and second holding sections comprising a common support surface, the support surface including a first movable member in the first holding section and a second movable member in the second holding section, the first and second movable members being movable between a first position in which they protrude out of the support surface and a second position in which they protrude less from the support surface than in the first position, a first drive mechanism coupled to the first movable member and a second drive mechanism coupled to the second movable member, the first and second drive mechanisms being independently actuatable to move the first and second movable members between the first and second positions.

Preferably, the first and second drive mechanisms comprise a linearly movable member coupled to the respective movable member.

Preferably, the linearly movable member is coupled to the respective movable member by a rotatable member which is rotatable with respect to the linear movable member and the respective movable member. Typically, the linearly movable member is movable substantially perpendicularly to the direction of movement of the respective movable member.

Preferably, the first and second movable members are movable in a direction substantially perpendicular to the base surface.

In accordance with a second aspect of the present invention, there is provided a mold half comprising a support member, two mold cavity members movably mounted on the support member for movement relative to the support direction in a first direction, a mold cavity housing being movably mounted on the support member for movement relative to the support member in a direction substantially parallel to the first direction, and biasing means mounted between the mold cavity housing and the support member to bias the mold cavity housing away from the support member.

Preferably, the mold half further comprises a first mold cavity actuator coupled to the first mold cavity member and a second mold cavity actuator coupled to the second mold cavity member, movement of the actuators moving the respective mold cavity member in the first direction.

Typically, the first and second mold cavity actuators extend through the support member.

In accordance with a third aspect of the present invention, there is provided molding apparatus for simultaneously molding a molding material around a number of separate substrates, each substrate having a semiconductor chip mounted thereon, the apparatus comprising a mold housing having a mold half according to claim 6 mounted thereon, the mold housing comprising a first mold cavity member holding section, in which the first mold cavity member is located, and a second mold cavity member holding section, in which the second mold cavity member is located, the first and second holding sections comprising a common support surface on which the support member is located, the support surface including a first movable member in the first holding section and a second movable member in the second holding section, the first and second movable members being coupled to the respective mold cavity member, movement of the first and second movable members moving the respective mold cavity member in the first direction, a first drive mechanism coupled to the first movable member and a second drive mechanism coupled to the second movable member, the first and second drive mechanisms being independently actuatable to move the first and second movable members between the first and second positions.

BRIEF DESCRIPTION OF THE DRAWINGS

An example of molding apparatus in accordance with the invention will now be described with reference to the accompanying drawings, in which.

DESCRIPTION OF THE PREFERRED EMBODIMENTS

Figure 1:
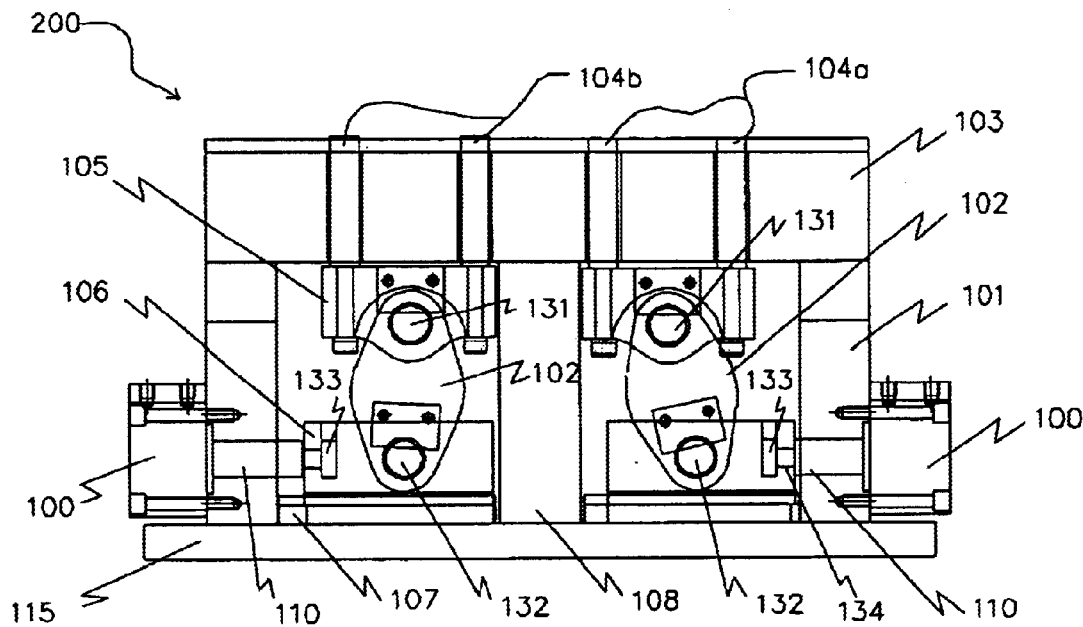
FIG. 1 is a cross-sectional view of a mold housing.
Figure 2:
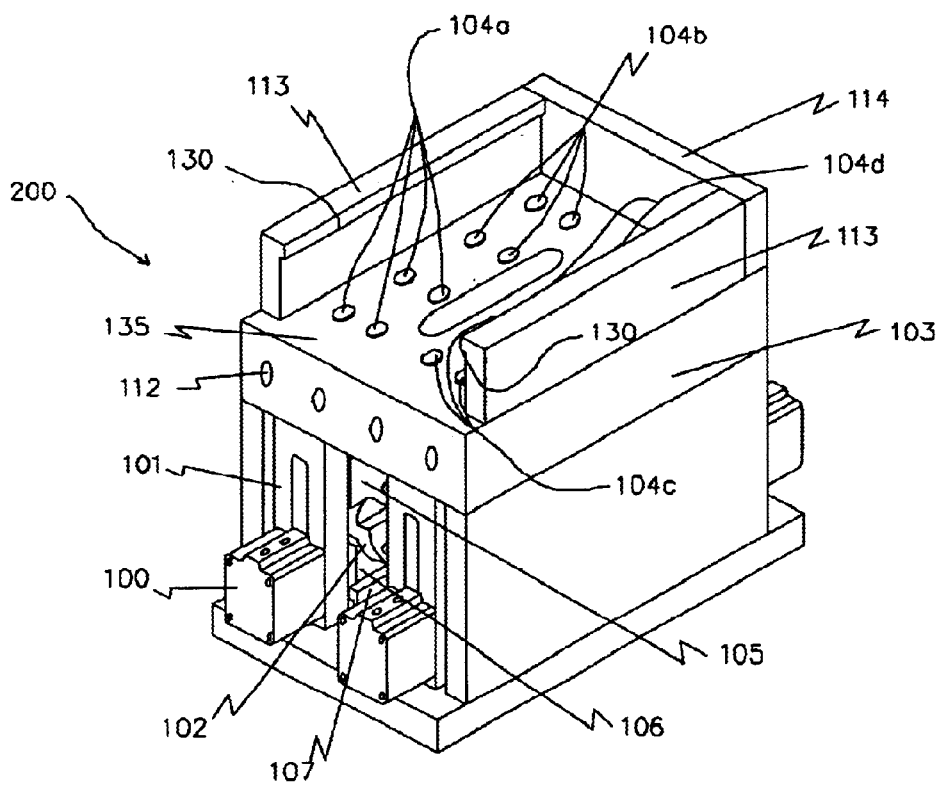
FIG. 2 is a perspective view of the mold housing.

FIGS. 1 and 2 show a mold housing 200 which includes a heat plate 103 in which are located a number of heater rods 112. The heat plate 103 has a top surface 135 on which are mounted two opposing guide plates 113 and an end plate 114. The guide plates 113 each include a lower recessed section 130 into which co-operates with a corresponding formation 137 in a lower mold chase 10 (see FIG. 3) to permit the lower mold chase 10 to be inserted between the guide plates 113.

The heat plate 103 has four sets of four movable rods 104*a*, 104*b*, 104*c*, 104*d* located in it. The lower ends of each set of the movable rods 104*a*–104*d* are coupled to a corresponding mounting plate 105 to which a toggle arm 102 is pivotably coupled via a rotatable coupling 131. The other end of the toggle arm 102 is coupled by a rotatable coupling 132 to a linearly movable toggle shoe 106 which is slidably mounted on a slide plate 107. Each toggle shoe 106 is connected to a push rod 110 by an engagement head 133 on the end of the push rod 110 which engages in a slot 134 in the toggle shoe 106. Each push rod 110 is driven by a pneumatic cylinder 100.

Therefore, there are in total, four mounting plates 105, four toggle arms 102, four toggle shoes 106, four slide plates 107, four push rods 110 and four pneumatic cylinders 100. That is, one for each set of movable rods 104a–104d. Although in this example of the invention pneumatic cylinders 100 are used, any suitable type of linear actuator could be used drive the push rods 110. Examples of suitable linear actuators include hydraulic cylinders, linear motors and ball-screw mechanisms.

The pneumatic cylinders 100 are mounted on support plates 101 which together with a central support 108 support the heat plate 103 on base plate 115.

Figure 3:
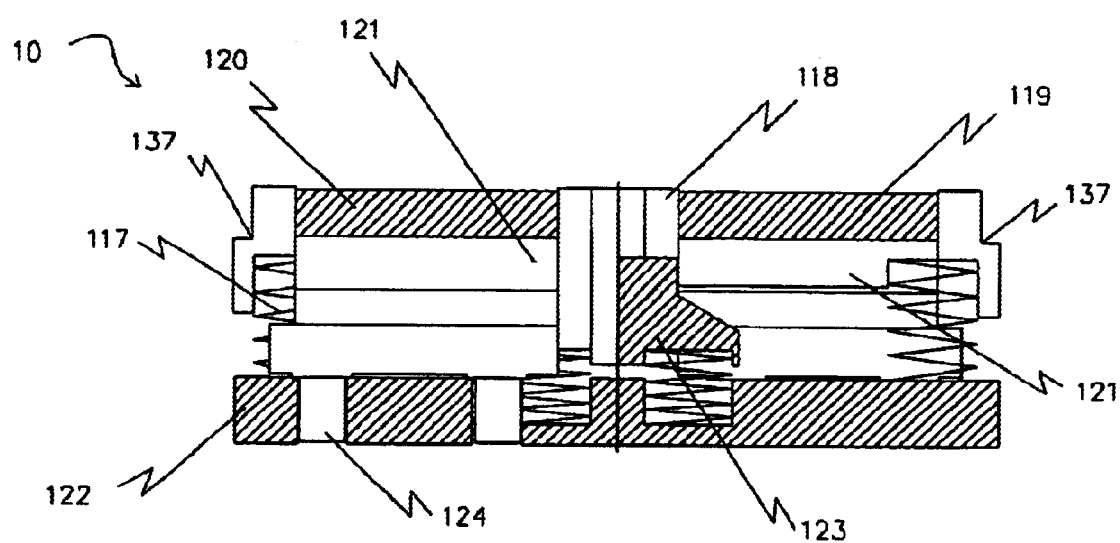
FIG. 3 is a cross-sectional view of a lower mold chase.

FIG. 3 is a cross-sectional view of a mold chase 10, which includes a left hand lower cavity bar 120 and a right hand lower cavity bar 119. The left and right lower cavity bars 119, 120 are mounted in a chase block 118 which is movably mounted on a chase base 122 by means of biasing means 117, which are typically in the form of helical springs. This enables the chase block 118 to be movable with respect to the chase base 122 but to be biased to the position shown in FIG. 3. Extending through the chase base 122 are movable rods 124 which support the right and left lower cavity bars 119, 120 via vacuum blocks 121, which are located between the chase base 122 and the cavity bars 119, 120.

When the mold chase 10 is inserted in between the guide plates 113 of the mold housing 200, the movable rods 124 align with the movable rods 104 in the heat plate 103 and the chase base 122 sits on the top surface 135 of the heat plate 103. After the mold chase 10 has been inserted into the mold housing 200, the two sets of movable rods 104a, 104b are aligned with the movable rods 124 below the left hand lower cavity bar 120 and the two sets of movable rods 104c, 104d are aligned with the movable rods 124 below the right hand lower cavity bar 119. Hence, up and down movement of the sets of movable rods 104a–104d will move the respective lower cavity bar 120, 119 up or down.

When the mold housing 200 moves the unit block 118 into contact with the upper mold half, the clamping force between the unit block 118 and the upper mold half causes the unit block 118 to move towards the chase base 122 against the action of the biasing springs 117 The clamping force between the unit block and the upper mold half is chosen such that the unit block is moved downwards with respect to the chase base 122 but so that the lower cavity bars are still not in contact with upper mold half cavity bars. The pneumatic cylinders 100 are then activated to drive the push rods 110 out of the cylinders 100 so that the toggle shoes move towards the centre support plate 108 and the rods 104a–104d are moved upwards. This moves the rods 124 upwards, which in turn moves the lower cavity bars upwards and into contact with the upper cavity bars. As each set of rods 104a–104d can be moved independently of the others, they can be moved up by different amounts to compensate for differences in the thickness of two substrates located in each of the cavity bars 119, 120. For example, if the substrate in the left lower cavity bar is less than that in the right lower cavity bar, the sets of rods 104a, 104b will be moved up more than the sets of rods 104c, 104d to compensate for the difference in thickness between the substrates. This enables approximately the same clamping force to be applied between each set of cavity bars, irrespective of differences in substrate thickness.

We claim:

1. Molding apparatus for simultaneously molding a molding material around a number of separate substrates, each substrate having a semiconductor chip mounted thereon, the apparatus comprising a mold housing adapted to have mounted thereon a mold half comprising two mold cavity members, the mold housing comprising a first mold cavity member holding section and a second mold cavity member holding section, the first and second holding sections comprising a common support surface, the support surface including a first movable member in the first holding section and a second movable member in the second holding section, the first and second movable members being movable between a first position in which they protrude out of the support surface and a second position in which they protrude less from the support surface than in the first position, a first drive mechanism coupled to the first movable member and a second drive mechanism coupled to the second movable member, the first and second drive mechanisms being independently actuatable to move the first and second movable members between the first and second positions.

2. Apparatus according to claim 1, wherein the first and second drive mechanisms comprise a linearly movable member coupled to the respective movable member.

3. Apparatus according to claim 2, wherein the linearly movable member is coupled to the respective movable member by a rotatable member which is rotatable with respect to the linear movable member and the respective movable member.

4. Apparatus according to claim 2, wherein the linearly movable member is movable substantially perpendicularly to the direction of movement of the respective movable member.

5. Apparatus according to claim 1, wherein the first and second movable members are movable in a direction substantially perpendicular to the common support surface.

6. A mold half comprising a support member, two mold cavity members movably mounted on the support member for movement relative to the support direction in a first direction, a mold cavity housing being movably mounted on the support member for movement relative to the support member in a direction substantially parallel to the first direction, and biasing means mounted between the mold cavity housing and the support member to bias the mold cavity housing away from the support member.

7. A mold half according to claim 6, further comprising a first mold cavity actuator coupled to the first mold cavity member and a second mold cavity actuator coupled to the second mold cavity member, movement of the actuators moving the respective mold cavity member in the first direction.

8. A mold half according to claim 7, wherein the first and second mold cavity actuators extend through the support member.

9. Molding apparatus for simultaneously molding a molding material around a number of separate substrates, each substrate having a semiconductor chip mounted thereon, the apparatus comprising a mold housing having a mold half according to claim 6 mounted thereon, the mold housing comprising a first mold cavity member holding section, in which the first mold cavity member is located, and a second mold cavity member holding section, in which the second mold cavity member is located, the first and second holding sections comprising a common support surface on which the support member is located, the support surface including a first movable member in the first holding section and a second movable member in the second holding section, the first and second movable members being coupled to the respective mold cavity member, movement of the first and second movable members moving the respective mold cavity member in the first direction, a first drive mechanism coupled to the first movable member and a second drive mechanism coupled to the second movable member, the first and second drive mechanisms being independently actuatable to move the first and second movable members between the first and second positions.

* * * * *